Aug. 3, 1954
H. AUGER
2,685,260
POWER TRANSMISSION MECHANISM
Filed Dec. 27, 1946
12 Sheets-Sheet 1
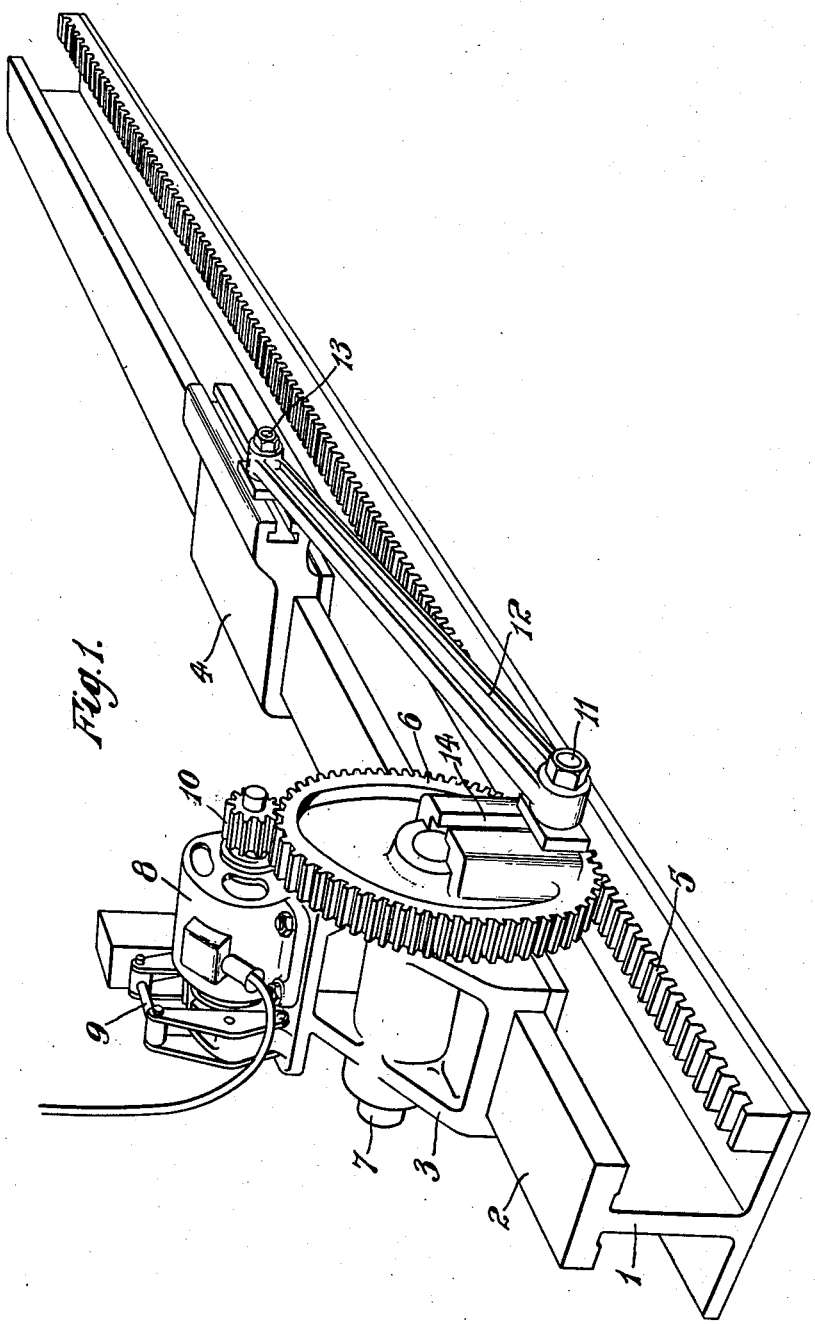

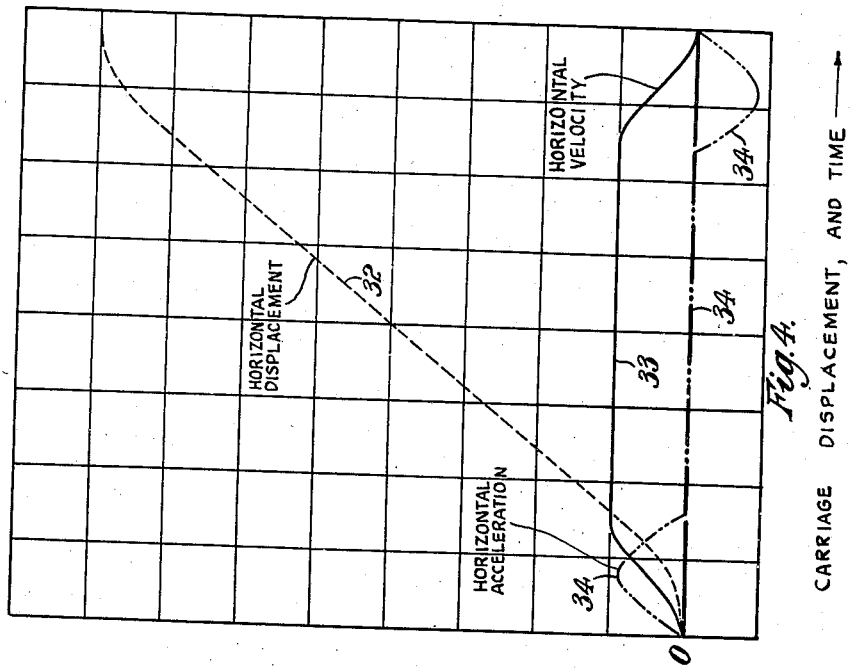
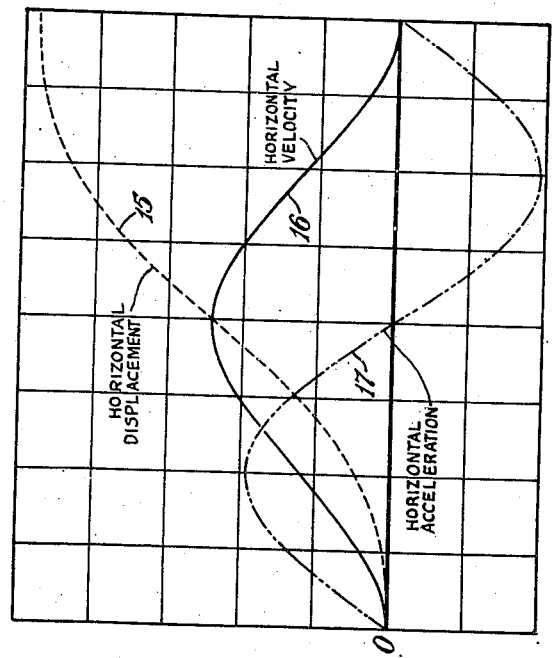

Aug. 3, 1954
H. AUGER
2,685,260
POWER TRANSMISSION MECHANISM
Filed Dec. 27, 1946
12 Sheets-Sheet 5
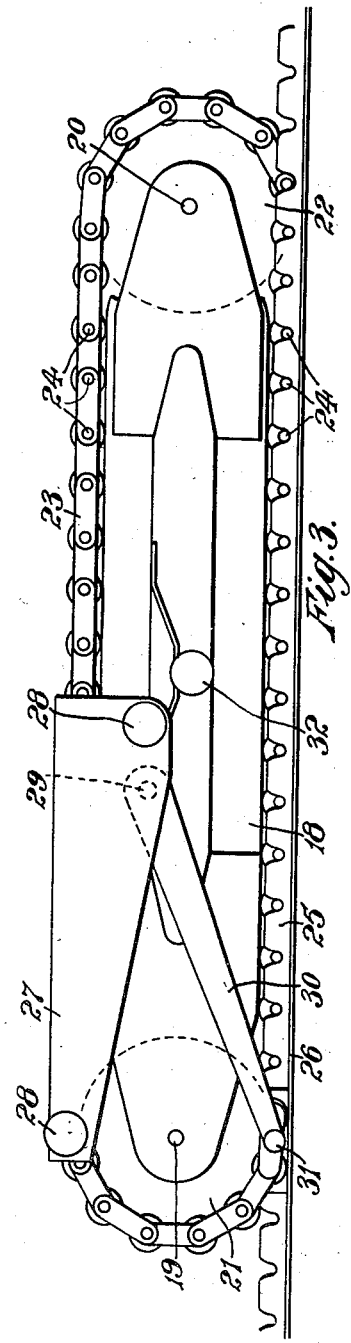
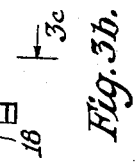
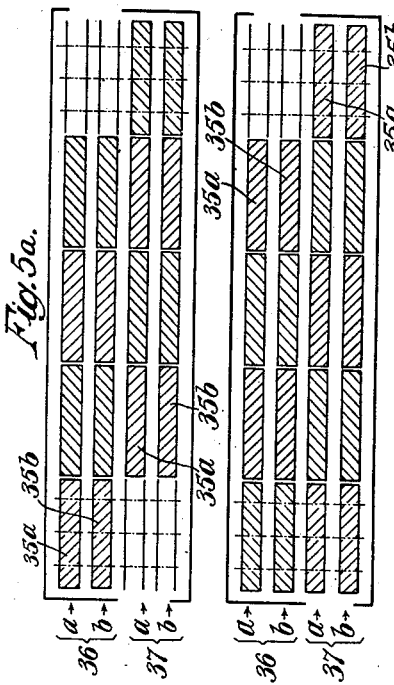
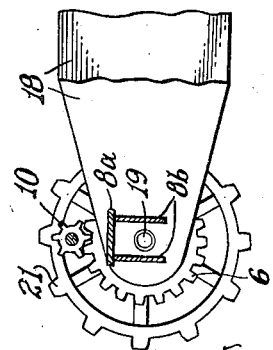
Inventor
Harold Auger
by Walter S. Oleston
ATTORNEY

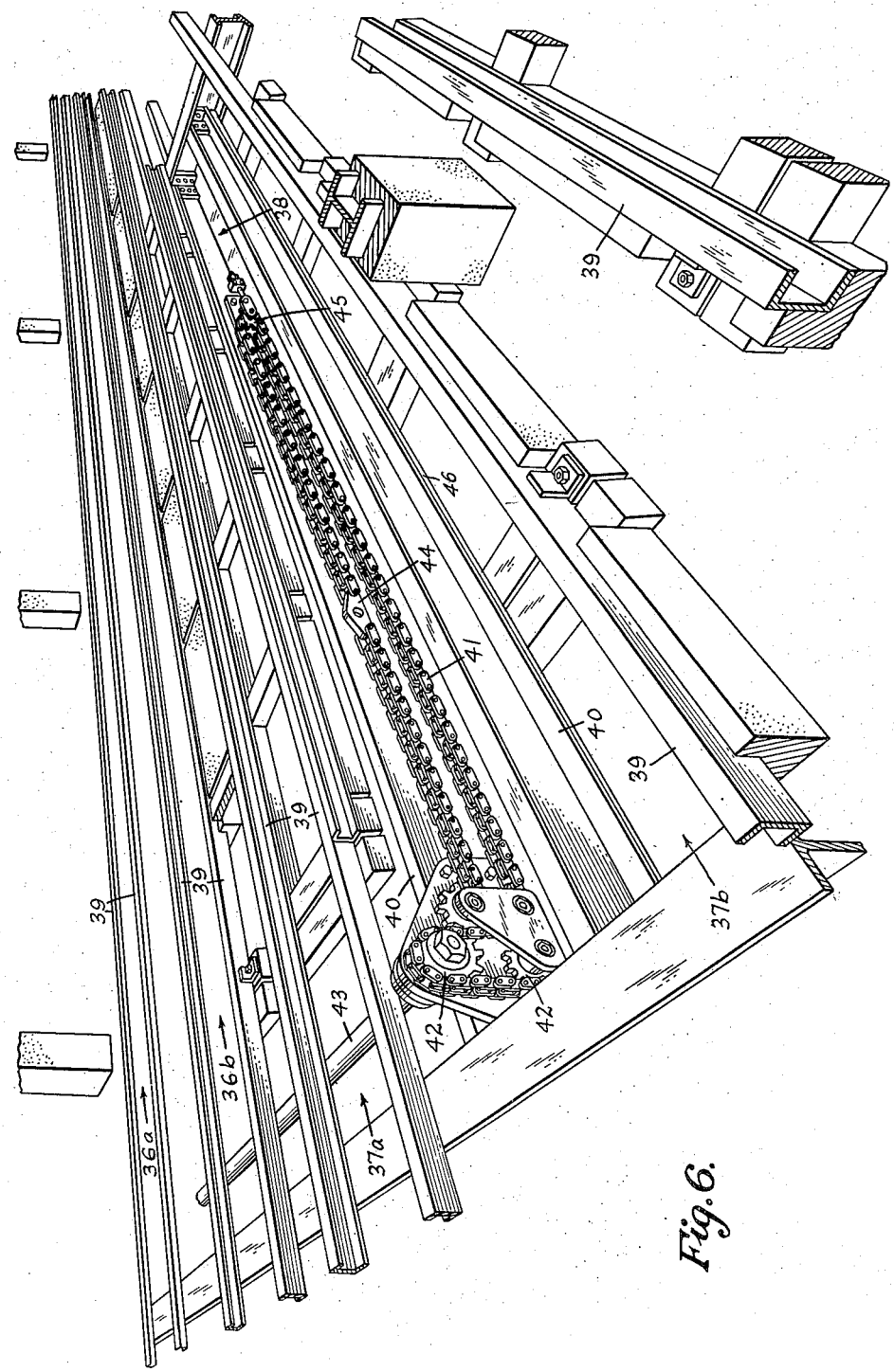

Aug. 3, 1954

H. AUGER 2,685,260

POWER TRANSMISSION MECHANISM

Filed Dec. 27, 1946

H. AUGER 2,685,260

POWER TRANSMISSION MECHANISM

Filed Dec. 27, 1946

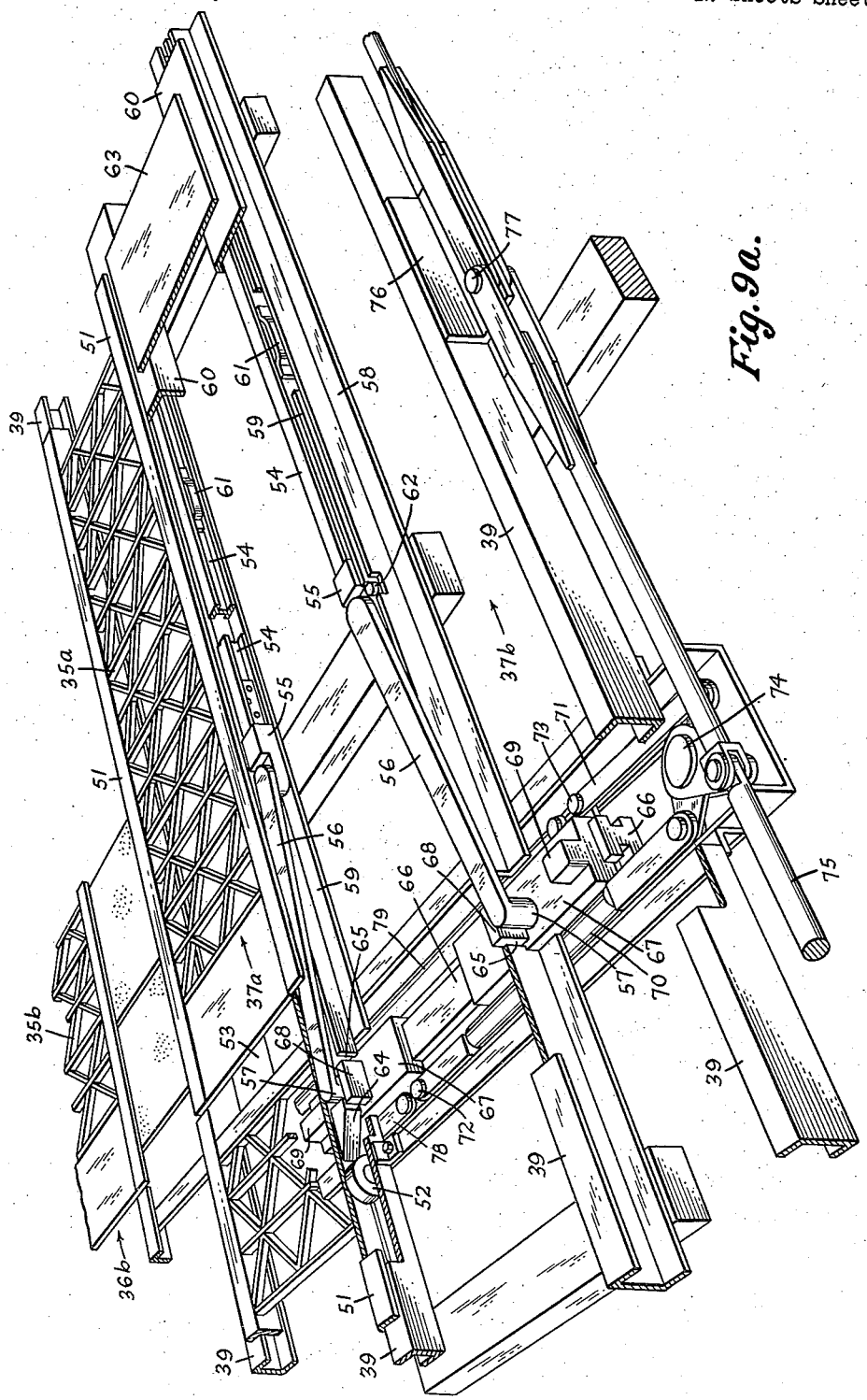

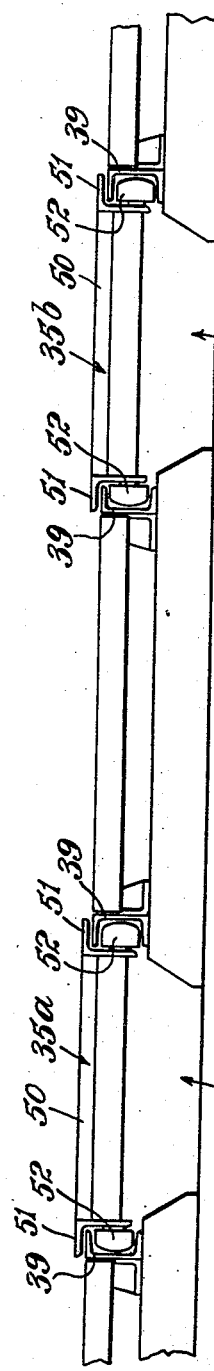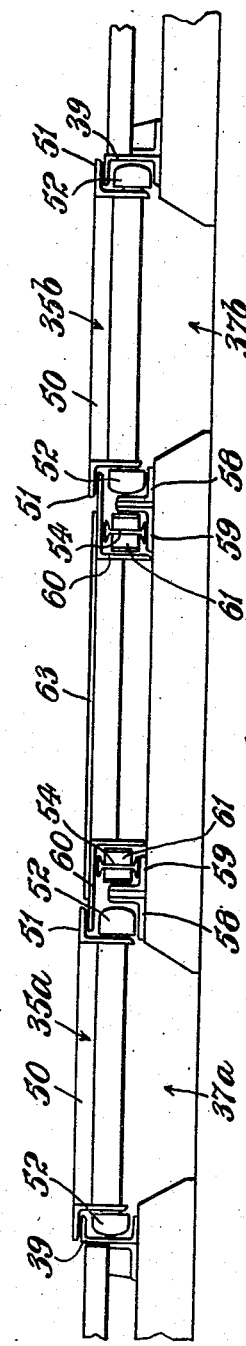

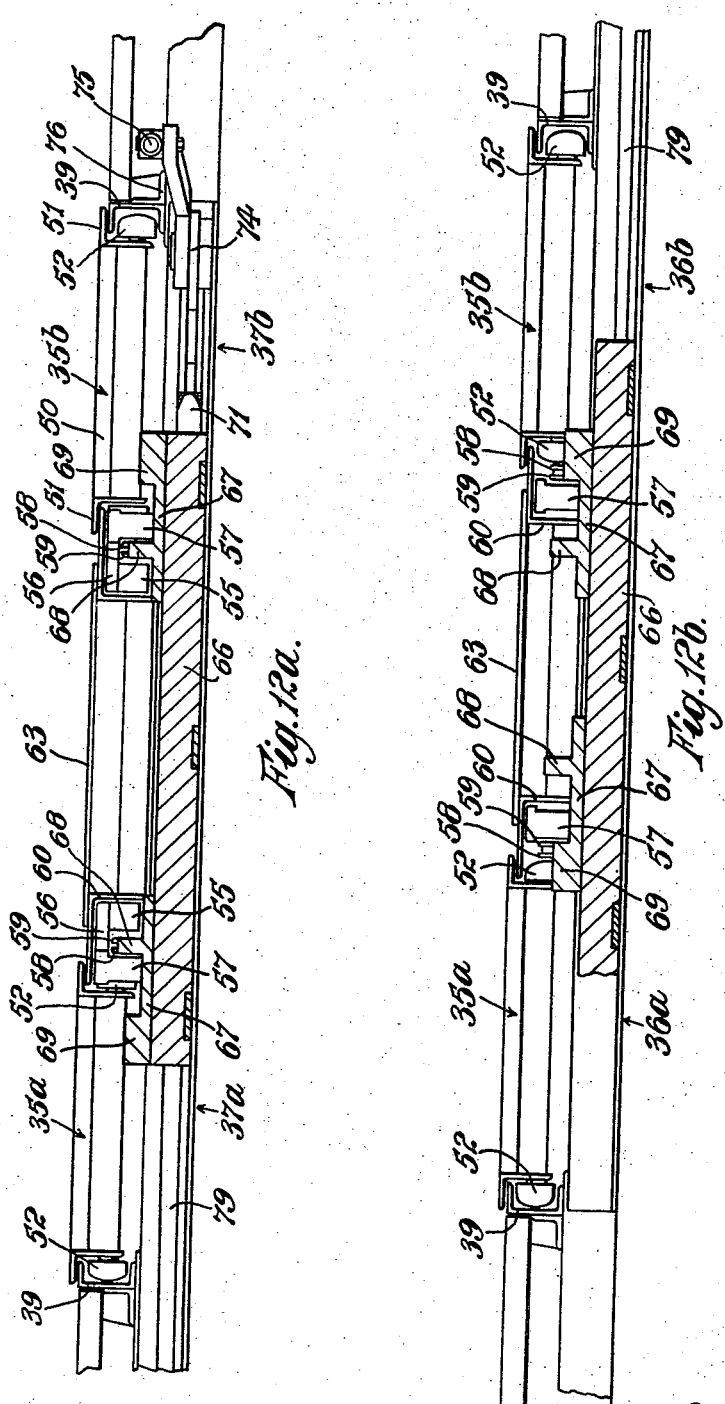

Patented Aug. 3, 1954

2,685,260

UNITED STATES PATENT OFFICE 2,685,260

POWER TRANSMISSION MECHANISM

Harold Auger, Maidenhead, England

Application December 27, 1946, Serial No. 718,737

Claims priority, application Great Britain
January 4, 1946

37 Claims. (Cl. 104—162)

This invention relates to power transmission mechanisms and the employment thereof in moving a load between two spaced positions of rest.

A principal object of the invention is to enable a constant speed power source to be used for this purpose, such as a simple electric motor and simple limit switches, and to render complex control gear unnecessary. Other objects are:

To permit the load to be displaced at substantially zero terminal acceleration and deceleration;

To enable a substantial part of the load displacement to be effected at constant velocity;

To enable the load to be moved between accurately predetermined positions, and at the same time permit a drive portion of the mechanism to overrun the nominal limits of its travel without affecting the load;

To provide an improved driving mechanism which has the above characteristics and which is adapted to reciprocate any desired useful load, such as (for example, but not by way of limitation) the table of a planing machine, or the platforms of mechanical storage equipment for motor vehicles or other objects;

To improve mechanical storage equipment of the kind in which such vehicles or other stored objects are circulated on movable platforms by successive movements of the latter along and between ranks of such platforms, the movements being carried out smoothly, and the drive mechanism occupying the minimum possible vertical depth so as to be accommodated within the floor thickness of a modern steel frame building and to afford substantially uninterrupted floor surfaces; and To provide, in such storage equipment, improved means for coupling and uncoupling the platforms to and from the driving mechanism and for blocking the platforms against movement when desired.

A simple driving mechanism embodying the present invention may comprise a wheel or disc, and a fixed, straight horizontal track along which the wheel is rolled back and forth, the wheel carrying a crank pin or coupling which is located adjacent the rolling periphery of the wheel, and the coupling being connected to a reciprocable load by means such as the usual pitman. Thus as the wheel rolls along the track, starting and finishing with the coupling at the track level, the coupling describes a cycloidal curve in space, and substantially the horizontal component of the cycloidal motion of the coupling is imparted to the load. As the wheel rolls along the track, the load accelerates from rest until it momentarily attains twice the translational velocity of the wheel, and then decelerates to rest after travelling a distance equal to the rolling periphery of the wheel. Due to the cycloidal motion of the coupling, the initial acceleration and final deceleration of the load are zero or substantially so.

Another embodiment of the present invention may use an elongated carriage instead of the simple rolling wheel. Such a carriage may comprise a pair of substantially coplanar wheels journaled at spaced points on a chassis or frame, and an endless flexible band which encircles and is free to circulate about the wheels. In this form of the invention, the coupling is fixed to the endless band, and the pitman extends between the coupling and load as before. The carriage may move along the same horizontal track, travelling on the flexible band, much as a military tank rolls on its Caterpillar treads.

As the carriage moves, starting with the coupling lying at the level of the track and between the wheel centers, the coupling remains stationary until one of the wheels passes over it. Then the coupling moves around the outer periphery of this wheel and describes the first part of a cycloidal curve in space; it then moves along the upper run of the flexible band, between the two wheels, and finally passes around the outside periphery of the second wheel in describing the final half of a cycloidal curve. After the coupling returns to the track level, it remains stationary even though the carriage may continue on for some distance. The carriage may thus overrun without affecting the position of the load, so long as the overrun does not exceed the distance between centers of the carriage wheels.

As the carriage moves, the load accelerates from rest until it attains twice the translational velocity of the carriage, maintains this speed while the coupling moves along the upper run of the flexible band, and then decelerates to rest, the initial acceleration and final deceleration being zero or substantially so, and the starting and finishing positions of the load being precisely determined in spite of any overrun of the carriage within the above limits.

The carriage may, of course, take a number of forms other than the elongated one just described. It may be circular, for example, and the flexible band may be circulated about it in a circular path. In whatever form, the chassis itself does not rotate. But since the motion of the coupling is the same whether it is mounted at the rolling periphery of an actual wheel or on a circular band on a circular carriage, and since the coupling also has in part the same motion when mounted on an elongated flexible band on a two-wheel carriage, it is sometimes convenient to call the back and forth motion of the carriage a rolling movement (in the same sense that a military tank "rolls" on its treads), and to refer to the flexible band as defining the rolling periphery of the mobile member.

Viewed in a broader sense, the driving mechanism of the present invention includes a mobile member (which may be the above wheel or carriage, or its equivalent) having one connection to the load (this connection may be the coupling or its equivalent) and another connection to a relatively fixed anchor (the anchor may be the fixed track or its equivalent, and the second connection may be the rolling connection between the mobile member and the anchor). The mobile member is capable of traveling bodily with respect to both the load and the anchor along a predetermined path which has at least a component paralleling the direction in which the load is displaced. The coupling is arranged to be driven simultaneously along another predetermined path, which is defined upon the mobile member (as by the two wheels of the elongated carriage), and which in part at least lies transverse to the path of the load. A power source, such as an electric motor, either drives the coupling directly and thus causes resultant translational movement of the mobile member, or it drives the mobile member directly and thus causes resultant movement of the coupling in its path. Components of the motions of the coupling and of the mobile member which are transverse to the direction of load displacement are discarded, as by means of the pitman, so that the resultant motion of the load is a composite of selected components of the simultaneous movements of the mobile member in its path and of the coupling in its path upon the mobile member. Since the mechanism modifies the simple motion characteristics of the power source, it may be referred to as a driven modulating mechanism.

At one or both of its end points, the path of the coupling as defined upon the mobile member is substantially parallel with the path of the mobile member. The mechanism is so proportioned and arranged that at one or both end points of the coupling's said path, the relative motion between the coupling and the mobile member parallel with the load displacement is substantially equal and opposite to the actual travel of the mobile member itself in a direction parallel with the load displacement, so that these two motions momentarily neutralize one another. Hence, at one or both ends of the load's path, and independently of the acceleration or deceleration of the mobile member or of the power source, the resultant motion transmitted to the load is inherently zero or substantially so. So too are the terminal velocity, acceleration and deceleration of the load.

Preferably the mobile member makes positive rolling engagement with the track, primarily to prevent slippage. Thus the track may be in the form of a toothed rack and the flexible band may be a link chain meshing therewith.

Since the driving mechanisms of this invention reciprocate back and forth, terms used herein to describe the movement of the load, of the mobile member, or of the coupling are intended to include both forward and reverse motion in such directions, unless the context indicates to the contrary.

The same motion characteristics described above can be obtained with invert forms of these mechanisms, in which the track, instead of being relatively fixed, is free to move and is connected directly to the load to cause displacement thereof. The coupling, on the other hand, is then restrained from substantial motion in the direction of the load displacement, and the mobile member thus travels back and forth when the coupling is caused to move in its predetermined path on the mobile member. The direction in which the track and the load move depend upon the direction in which the coupling moves in its path.

Load driving mechanism according to the present invention may include (a) one of the drive modulating mechanisms just described, (b) an intermediate member which may be called a "collector," and which is reciprocated by the modulating mechanism between two spaced terminal positions, and (c) load coupler means, operable when the collector is at these positions, for connecting and disconnecting the collector to and from the load. The load coupler means may be reciprocable with the collector, and may be operable at fixed stations that correspond with the terminal positions of the collector, coupler operating means being located at both said stations and being adapted to be actuated simultaneously and in the same sense. The collector thus acts as an intermediate member to permit ready connection and disconnection of the load to and from the drive modulating mechanism. Preferably, while travelling between the fixed operating stations, the load coupler means is positively held either in engagement with the load or disengaged from it.

The load may take the form of platforms or sets of platforms for supporting motor cars or other stored objects in a rank, and the collector may be moved from one of its terminal positions to the other while coupled to a platform, and then return unloaded to the first terminal position to pick up another platform. It is preferable for the length of each platform or set of platforms to be substantially equal to the distance between the load coupling stations, so that the platforms may be end-coupled to one another to form one or more continuous trains or ranks.

Means may also be provided at the load coupling stations for selectively blocking or freezing the platforms when they are disconnected from the collector.

In general, storage equipment comprising platforms for supporting motor cars or other objects in a rank may, according to the present invention, include a collector which is reciprocable between two spaced positions along the rank, a driving mechanism for thus moving the collector, load coupler means operable for connecting and disconnecting the collector to and from the platforms when the collector occupies either of said spaced positions, and load coupler operating means which may also block the platforms when and while the latter are disconnected from the collector. Such operating means may also be adapted to block the platforms in a manner that leaves the collector free to reciprocate unloaded, or alternatively, to allow the platforms freedom of movement when disconnected from the collector.

The invention and certain of its applications will now be described by way of example, with reference to the accompanying drawings, whereof:

Figure 1 is a perspective view of a simple form of the drive modulating mechanism comprising a single rolling wheel;

Figure 2 shows typical displacement, velocity and acceleration curves for the single-wheel form of the mechanism shown in Figure 1;

Figure 3 is a side elevation of a two-wheel endless band form of the drive modulating mechanism;

Figure 3b is a fragmentary view of the left hand end of Figure 3 showing a driving motor mounted upon the mechanism;

Figure 3c is a cross-sectional view on the line 3c—3c, Figure 3b;

Figure 4 shows curves similar to those of Figure 2, but for the two-wheel form of the mechanism shown in Figure 3;

Figures 5a, 5b are diagrams showing plans of storage or parking floors provided with movable platforms for motor cars or other objects, which are arranged in such a way as to have either two vacant spaces (Figure 5a) or only a single spare space (Figure 5b), the platforms of each rank being arranged in spaced pairs, each platform adapted to support two of the four wheels of a car;

Figure 6 is a general perspective view of part of a parking floor of this kind, broken open to show the driving chain of a drive modulating mechanism arranged beneath the floor surface for moving one of the two parallel ranks of platforms, it being understood that the other rank is similarly driven by another like mechanism;

Figure 7:
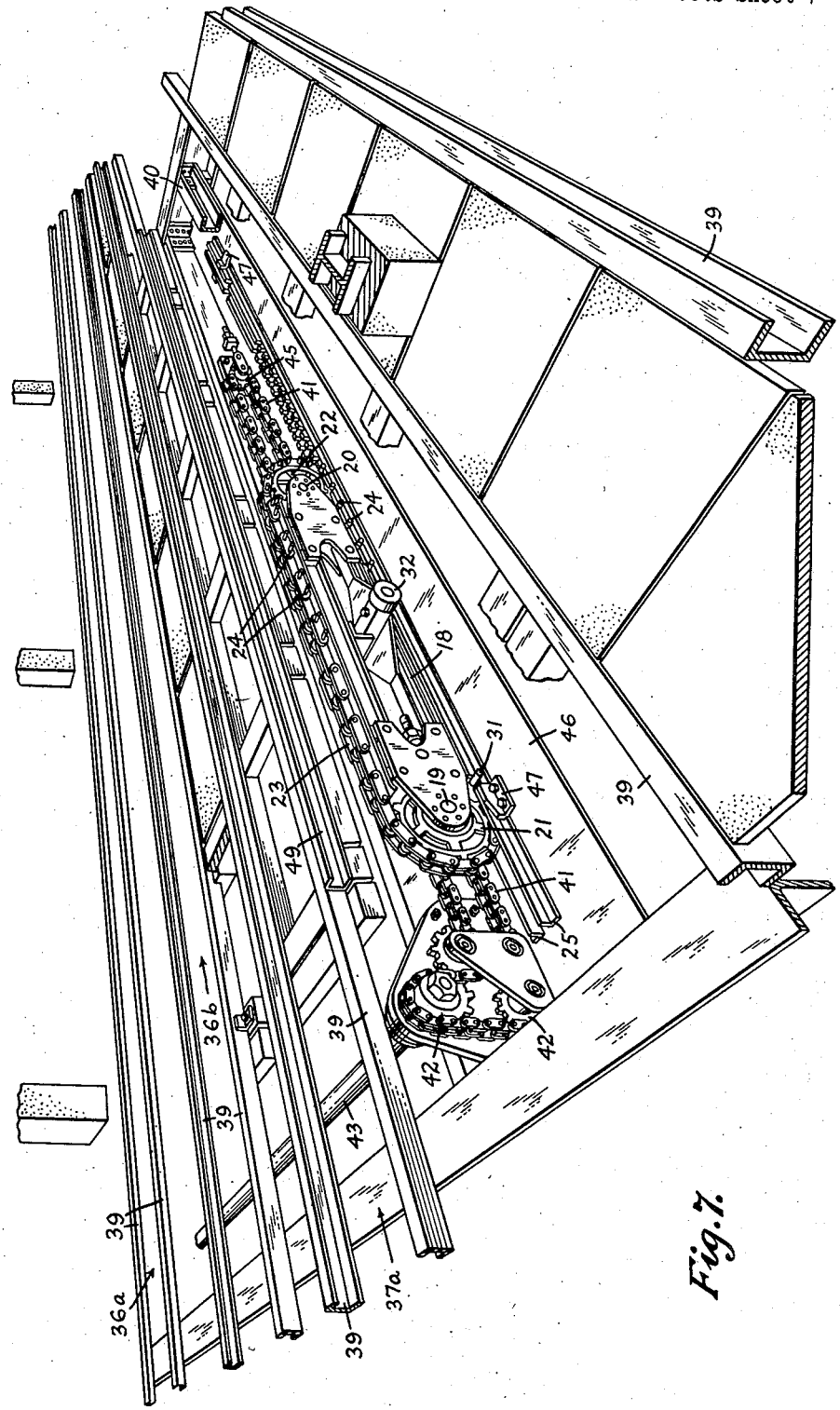
Figure 8:
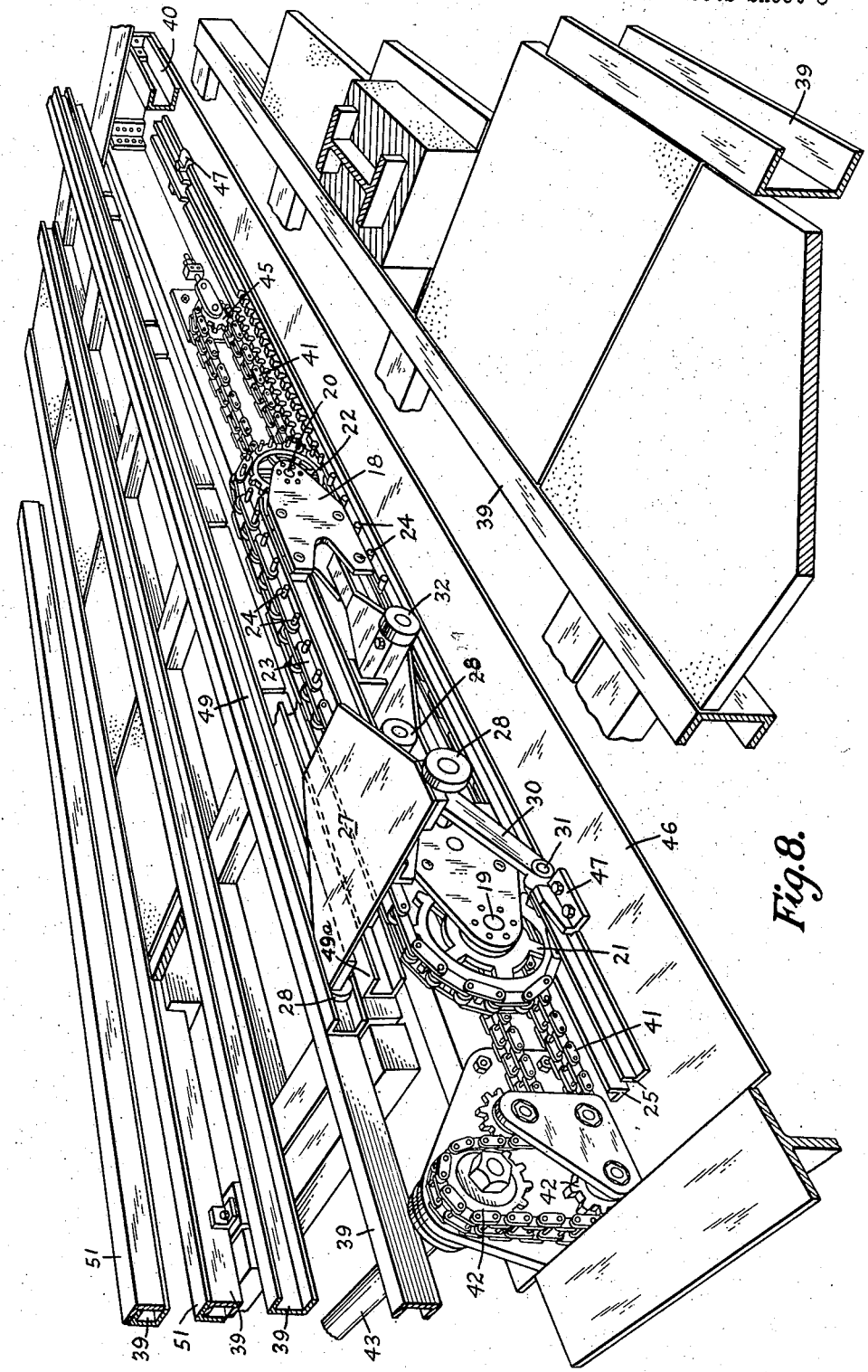

Figure 7 differs from Figure 6 only in showing the drive modulating mechanism (see Figure 3) in position connected to the driving chain and certain parts of the floor filled in;

Figure 8 is a similar view to Figure 7, showing mounted on the drive modulating mechanism a collector through which the platforms may be drivably connected to the said mechanism;

Figure 9 is a more extended general view showing the mechanism whereby the platforms are coupled and uncoupled to and from the collector or blocked against movement;

Figure 9a being part of Figure 9 to a larger scale; and

Figure 9b being another part of Figure 9 to an enlarged scale;

Figure 10 is a somewhat diagrammatic cross-section along the line 10—10 of Figure 9;

Figure 11 is a somewhat diagrammatic cross-section along the line 11—11 of Figure 9; whilst Figures 12a and 12b together form a somewhat diagrammatic cross-section along the line 12a—12b of Figure 9.

Figure 1A:
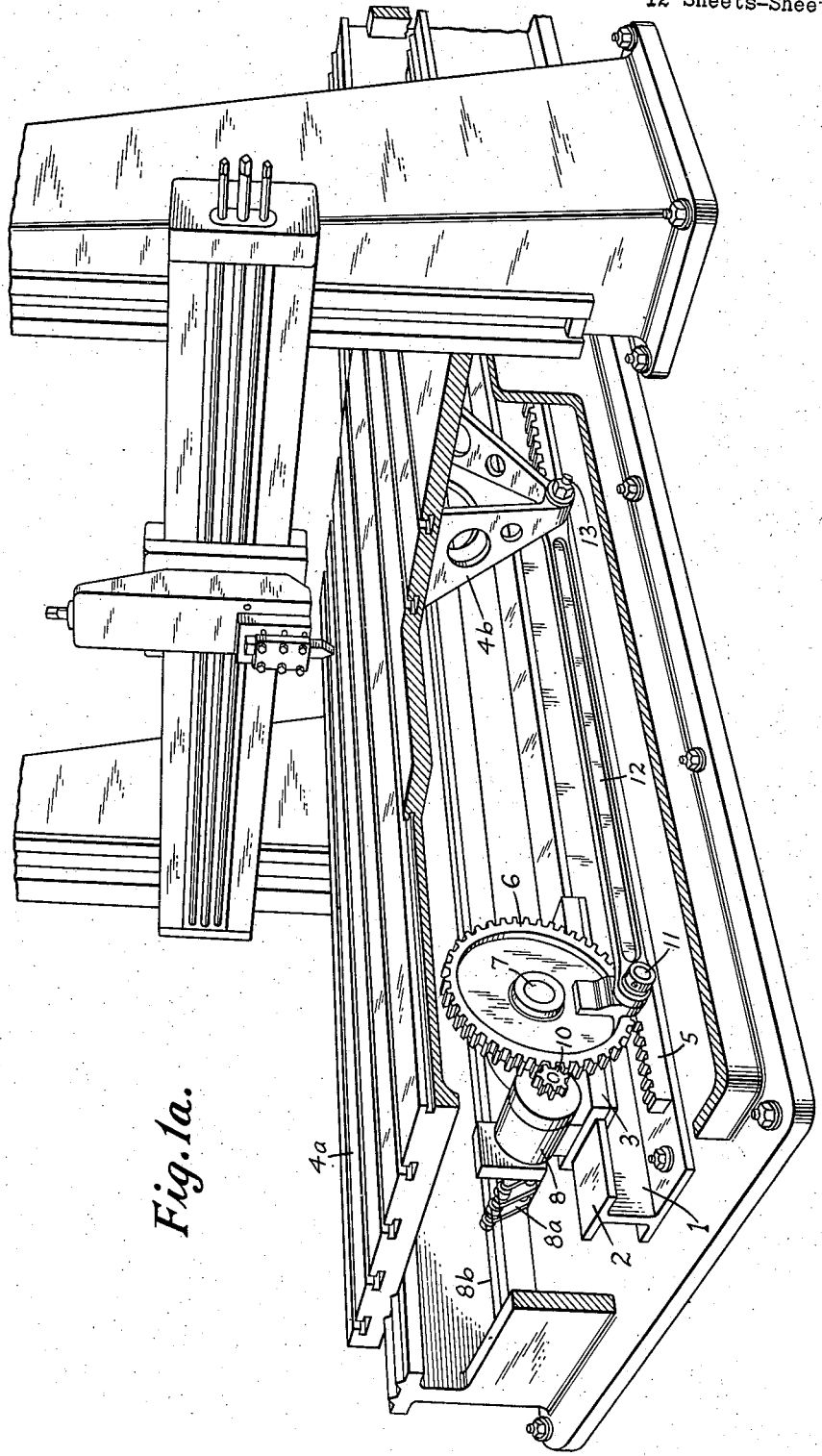
Figure 1a shows the mechanism of Figure 1 arranged to drive the table of a planing machine.

In the mechanism shown in Figure 1, the bed 1 has a flanged top 2 forming a guide for two slides, one 3 of which forms the drive modulating carriage whilst to the other 4 of which the load, e. g. the reciprocable table 4a of a planing machine (see Figure 1a), may be connected. One of the lower flanges of the bed has on its upper face a toothed rack 5 along which is adapted to roll the gear wheel 6 mounted on the transverse shaft 7 of carriage 3 which also carries an electric motor 8 provided with an electro-magnetic brake 9 and with a toothed pinion 10 engaging wheel 6. On the outer face of wheel 6 is a coupling in the form of crank pin 11 pivotally coupled to one end of the link or pitman 12, the other end of which is similarly pivoted to pin 13 on slide 4. Slide 4 is a collector, as that term has been used above, since it is an intermediate member between the load (e. g., the planer table) on the one hand and the crank pin 11 and pitman 12 on the other hand, and since it serves to collect and transmit to the load the desired component of the motion of the crank pin, in this instance the horizontal component thereof. The mounting of this coupling pin 11 on the face of wheel 6 is made adjustable radially of the wheel in guides 14 so as to permit variation in the throw of the crank, whilst the mounting of pin 13 on slide 4 is similarly made adjustable in the direction of reciprocation. Limit switches (not shown), in the electrical power circuit to motor 8, are provided to prevent overrun of the sliding carriage 3 beyond the limits represented by one complete revolution of wheel 6.

Fig. 1a shows the mechanism of Fig. 1 arranged to drive the table 4a of a common form of planing machine, slide 4 of Fig. 1 taking the form of strut 4b in Fig. 1a, which strut is fixed to the under side of the planer table. Driving motor 8 in Fig. 1a is supplied with electric power through trolleys 8a and conductors 8b, the latter extending longitudinally under the planer table.

If wheel 6 is turned through one revolution from the position shown in Figure 1, where the center of pin 11 lies at the rolling periphery of the wheel and the pin starts from a position directly under the center of the wheel and adjacent the rack 5, the pin will trace a cycloidal curve in space and, after a complete revolution of the wheel, will again find itself directly under the center of the wheel and adjacent the rack, after having travelled horizontally a distance equal to the rolling periphery of the wheel. It will be observed that a radius vector drawn from the center of wheel 6 to the center of pin 11 rotates with the wheel as the latter rolls, and that this vector is directed downward and lies perpendicular to rack 5 both at the beginning and at the end of each revolution of the wheel. It will also be observed that with respect to the mobile member itself, which comprises carriage 3 and wheel 6, the path of pin 11 is a circle, and that at its end points, i. e., at the beginning and at the end of each revolution of the wheel, this circular path is substantially parallel with the path of the mobile member, i. e., parallel with the rack 5.

The horizontal components or projections of the characteristics of the cycloidal motion of the pin 1 are shown in Figure 2 for the condition of uniform rotation of wheel 6. In Figure 2 the horizontal abscissae represent units of time, since the rotation of the wheel 6 is assumed to be constant; they also represent $\theta$, which is the angular rotation of the wheel between 0° and 360° (taking 0° to be the position shown in Figure 1, where the radius vector from the center of the wheel to the center of pin 11 is directed vertically downward). The angle $\theta$ is at the same time a measure of the translational displacement of the wheel along the rack 5. The vertical ordinates represent displacement in units of distance, velocity in units of distance per unit of time, and acceleration in units of distance per unit of time per unit of time, for the respective curves. Broken line 15 represents the horizontal component of the displacement of pin 11, viz., $vt - r \sin \theta$, where $v$ is the uniform tangential velocity of pin 11 about shaft 7, $t$ is time, and $r$ is the crank radius at which pin 11 is set, the curve being drawn for the condition where $r$ is the radius of wheel 6, i. e., where pin 11 is at the rolling periphery of the wheel. Full-line curve 16 represents the horizontal component of the velocity of pin 11, viz., $v(1-\cos\theta)$, and chain dotted curve 17 represents the horizontal component of the acceleration of pin 11, viz., $$\frac{v^2}{r}\sin\theta$$

both of the latter formulae also being for the condition where $r$ is the radius of the wheel.

It will be observed that under these conditions the rotational velocity of pin 11 at all times equals the translational speed of wheel 6, and that the horizontal velocity of the pin at the beginning and the end of each revolution of the wheel is equal to and directly opposes the translational speed of the wheel. Thus, entirely apart from any acceleration or deceleration of wheel 6 itself, the resultant horizontal velocity of pin 11 and of its connected load is zero at both the start and finish of each revolution of the wheel, i. e., at both ends of the stroke of the drive modulating mechanism of Figure 1. This circumstance will also be observed from Figure 2, in which the horizontal velocity curve 16 of pin 11, which curve is a cosine function of $\theta$, starts and finishes at zero. Likewise evident from Figure 2 is the fact that the sine-function curve 17 of the pin's horizontal acceleration also starts and finishes at zero. Thus in addition to zero terminal velocity, the pin and its connected load also enjoy zero terminal acceleration and deceleration, whereby neither the motor 8 nor any other part of the mechanism is subjected to high starting or braking loads.

Slide 4 and the load to which it is connected partake very closely of the horizontal components of the motion of pin 11 which have been described above and are shown in Figure 2, but the motion of the slide and the load differ somewhat from that of the pin, in a well-known manner, because of the finite length of the link or pitman 12, as referred to in more detail below. This circumstance, however, does not affect the zero terminal velocity and acceleration characteristics above described.

It should be observed that in the mechanism of Figure 1 it is only when pin 11 is adjusted so that its center is at the rolling periphery of wheel 6 that the pin traces a true cycloidal curve in space. If the center of the pin is otherwise located, the curve of the pin departs from a true cycloid, and becomes a trochoid. Under such conditions the zero terminal horizontal velocity and acceleration characteristics that are inherent when the pin moves in a cycloid are less completely realized, but substantially negligible terminal horizontal velocity and acceleration are still afforded if the amount by which the center of the pin departs from the rolling periphery of the wheel is small.

Certain disadvantages are inherent in the simple form of drive modulating mechanism shown in Figure 1. For example, maximum velocity of displacement of the load is achieved only momentarily, part way through its travel; the depth of the mechanism, as represented by the diameter of wheel 6, is large in proportion to the displacement of the load which it can effect; and the load is subject to further and undesired displacement if the wheel overruns to any degree at the end of a revolution.

In the mechanism shown in Figure 3 wherein these disadvantages are overcome, the mobile member consists of a two-wheel carriage, the frame of which, denoted by 18 and somewhat schematically shown, carries on axles 19 and 20 at its ends the rotatable sprocket wheels 21 and 22 which are thereby spaced apart in the same plane. Around these sprockets and coplanar therewith extends an endless roller chain 23, the pins 24 of the rollers being laterally extended so that when they come into the lower run of the chain, their ends are able to engage the slots of rack 25 on the base plate 26. A so-called collector 27 for coupling with the load, and having rollers 28 for running along longitudinal guide rails (not shown in Figure 3), is connected through a pivot 29 with one end of a link or pitman 30 whose other end is pivoted on a coupling in the form of pin 31 projecting laterally from a part of the chain. As shown, pin 31 is at the rolling periphery of the carriage, which is defined by the chain 23. Rack 25, link 30 and pin 31 can of course be duplicated on the opposite side of the mobile carriage. The latter may be provided with a portable prime mover to turn the sprocket wheels 21 and 22 as in the Figure 1 arrangement. Such is illustrated in Figures 3b and 3c wherein a shelf 8a is secured to frame 18 by brackets 8b. Motor 8 mounted on shelf 8a drives pinion 10 which is meshed with gear 6 secured to sprocket 21. However in the form illustrated in Figure 3, the carriage is adapted to derive its power from an exterior source by suitably coupling its central shaft 32 to a longitudinally movable chain or other driving means.

Figure 3 shows the modulator carriage at one limit of its effective travel, i. e. with the collector 27 at one terminal position, the other limit being attained when pin 31 reaches a corresponding position beneath the axle 20 of the other sprocket after having passed around the outwardly directed periphery of both sprockets and over the intervening top of the carriage 18. Carriage 18, however, may overrun to the left of the position shown in Figure 3, by as much as the distance between axles 19 and 20, without this having any effect on the collector 27. If, on the contrary, carriage 18 is driven along rack 25 to the right of the position shown, pin 31 will be caused first to ride up sprocket 21 to a position above axle 19 whilst it traces out the first half of a cycloidal curve, then to travel in a straight line along with the top run of the chain at a velocity double that of the carriage and finally, as it rides down sprocket 22 to a position directly beneath axle 20, to trace out the second half of the cycloidal curve. At the right-hand end of its normal travel the carriage may again overrun by as much as the distance between axles 19 and 20, without causing any movement of pin 31 or collector 27.

If, as may happen in the practical construction of the mechanism of Figure 3, the center of pin 31 is not located precisely on the rolling circle of first one and then the other of sprockets 21 and 22, it will be understood that the end portions of the curve traced by the pin will not be opposite halves of a true cycloid, but will be portions of a closely related trochoid, as already explained in connection with the single-wheel mechanism of Figure 1. The complete curve of the loci of pin 31, consisting of a flat top and substantially cycloidal end portions, may conveniently be called an "extended cycloid" curve.

As in the case of the single-wheel version of this invention, it will be observed that a radius vector drawn from the center of each of sprockets 21 and 22 to the center of pin 31 rotates as the mobile carriage travels along rack 25, and that such radius vector from the center of sprocket 21 is directed downward and lies perpendicular to the rack at one end of the normal travel of the carriage, while such radius vector from the center of sprocket 22 is similarly directed and is similarly perpendicular to the rack at the other end of the carriage's normal travel. It will also be observed that the curved portions of the path of pin 31 with respect to the mobile member itself, i. e., those portions which are traced as the pin skirts the outer peripheries of the sprockets, are substantially opposite arcs of a circle and that at the end points of the path of pin 31 with respect to the carriage, i. e., at the points at which the pin begins to move in space and at which it is brought to rest in space, the pin's circular path is substantially parallel with the path of the carriage, i. e., parallel with rack 25.

Assuming the carriage to be moved at constant velocity and the pin 31 to lie successively on the rolling circles of sprockets 21 and 22, the characteristics of the horizontal components or projections of the motion of the pin are shown in Figure 4, in which the horizontal abscissa represents both horizontal carriage displacement and units of time, whilst the vertical ordinate has the same multiple significance as in Figure 2. The curves 32a (broken line) for displacement, 33 (full line) for velocity and 34 (chain-dotted) for acceleration of the pin 31 are based on exactly the same formulae as those governing Figure 2, except that, in the formulae for the two-wheel carriage, $\theta$ denotes the angular position of pin 31 on first one and then on the other sprocket instead of the rotation of the single wheel throughout as in the case of the Figure 1 mechanism, and except that each of the curves of Figure 4 has a central straight portion that corresponds with the displacement of pin 31 in a straight line between the sprockets 21 and 22, such displacement occurring at a uniform velocity which is the maximum speed attained by the pin. The maximum velocity of displacement can be maintained uniform over any desired distance represented by the straight portions of these curves and depending on the spacing apart of the sprockets 21 and 22. Moreover, this is done with small diameter sprockets so that the possible horizontal travel of the carriage is large in relation to the depth of the mechanism.

It will be observed that under these conditions the linear velocity of pin 31 with respect to the mobile carriage at all times equals the translational speed of the carriage, and that the horizontal velocity of the pin at the beginning and end of the normal travel of the carriage is equal to and directly opposes the translational speed of the carriage, so that as in the case of the single-wheel mechanism of Figure 1, and entirely apart from any acceleration or deceleration of the two-wheel carriage itself, the resultant horizontal velocity of pin 31 and of its collector 27 is zero at both the start and finish of each traverse of the collector. This circumstance will also be observed from Figure 4, in which the horizontal velocity curve 33 of the pin 31, the end portions of which follow a cosine function of $\theta$, starts and finishes at zero. Likewise evident from Figure 4 is the fact that the pin's horizontal acceleration curve 34, which in its end portions follows a sine function of $\theta$, also starts and finishes at zero. Thus in addition to zero terminal velocity, pin 31 and its collector 27 enjoy zero terminal acceleration and deceleration, so that the mechanism does not suffer high starting or braking loads.

As in the case of slide 4 of Figure 1, collector 27 of Figure 3 partakes very closely of the horizontal components or projections of the motion of coupling pin 31 which have been described above and are shown in Figure 4, but the motion of the collector differs somewhat from that of the pin, in a well-known manner, because of the finite length of the link or pitman 30, as further discussed in the next paragraph.

The use of the pivotal links between the drive modulating mechanism and the load in the arrangements of both Figures 1 and 3 and the changing inclination of the links, with consequent slight alteration in the spacing of the pivot centres in the direction of travel, leads to corresponding well-known discrepancies between the velocity and other motion characteristics of the pivot pins 11 and 31 calculated on the basis of the stated formulae, and the motion characteristics of the respective loads, but the differences are so slight that they can be ignored in practice. These differences, however, do not affect the transmission to the load or to the collector of the zero terminal velocity and acceleration characteristics of the pins 11 and 31. Furthermore, these differences can be eliminated by substituting for the pivoted connecting links 12 and 30 a slotted plate connected to the load, the slot extending transversely to the path of the mobile member and the coupling 11 or 31 riding in the slot.

If different acceleration characteristics are desired at the ends of the load's travel in the mechanism of Figure 3, the two sprockets 21 and 22 may be of different diameters, in which case the path of pin 31, consisting of end portions each of which is a portion of a different cycloidal curve, and a central portion connecting the end portions, may be called a "differential extended cycloid."

In both Figures 1 and 3, it will be observed that the mobile member, i. e., the wheel 6 or the carriage 18, is connected both to the load and to a fixed anchor, the connection to the load in Figure 1 being coupling 11 which exerts its effect on the load through pitman 12 and slide or collector 4, and in Figure 3 being coupling 31 which exerts its effect through pitman 30 and collector 27, and the connection to the fixed anchor being the rolling engagement of the mobile member with the fixed track 5 (Figure 7) or 25 (Figure 3), the track being the anchor.

Figure 3A:
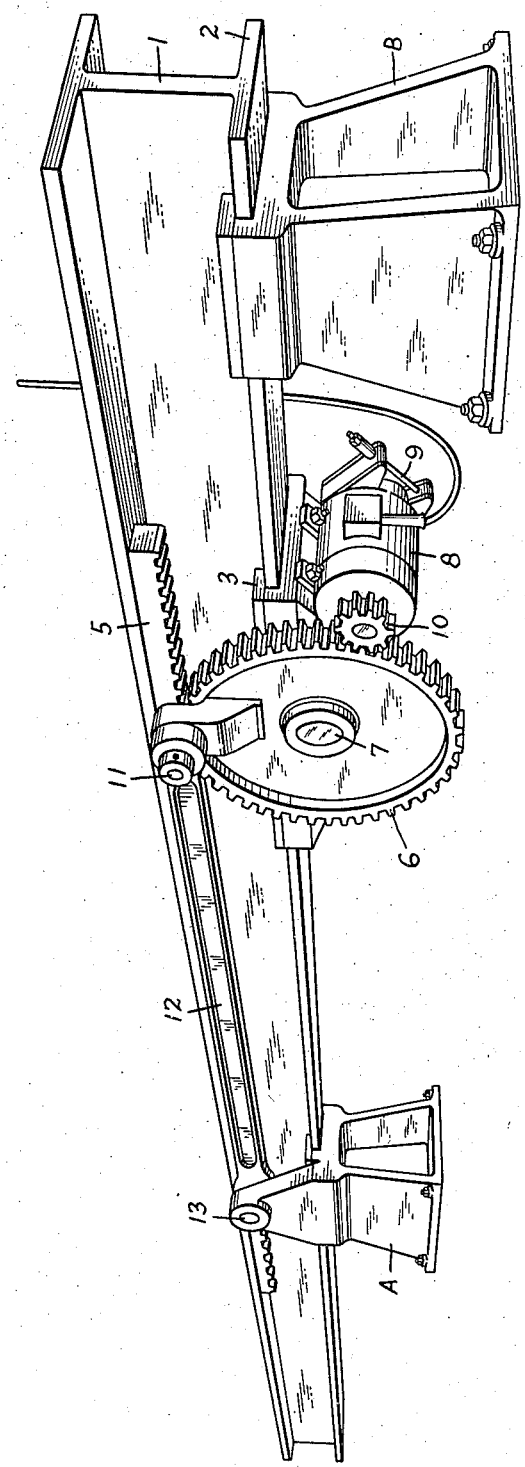
Figure 3a shows an invert form of the mechanisms of this invention.

The same motion characteristics of the devices of Figs. 1 and 3 can be obtained by invert forms of such mechanisms, in which the track is connected to the load itself and is free to reciprocate, and in which the coupling is restrained against substantial movement in the direction of load displacement. Fig. 3a shows such an invert mechanism, specifically an inversion of the Fig. 1 device.

In Fig. 3a the same reference characters used in Fig. 1 identify corresponding elements. Bed 1 is no longer fixed as in Fig. 1, but is slidably mounted in fixed pedestals A, B. As before, flange 2 forms a guide for slide 3 which constitutes a carriage on which are mounted gear wheel 6, shaft 7, electric motor 8, brake 9 and pinion 10, the latter engaging wheel 6. Toothed rack 5 is fixed to one of the upper flanges of bed 1, and meshes with wheel 6. Crank pin or coupling 11 is fixed at the rolling circle of wheel 6, and pitman 12 is pivoted to coupling 11 and to fixed pivot 13 on pedestal A. Coupling 11 is thus restrained from any substantial motion lengthwise of bed 1, but is free to move transversely (i. e., up and down) as wheel 6 rotates. Carriage 3 and wheel 6 will therefore reciprocate horizontally as the wheel is rotated by motor 8, and bed 1 and track 5 will also reciprocate horizontally in its pedestal slides, the motion of the reciprocating bed having the same displacement, velocity and acceleration characteristics as slide or collector 4 of the Fig. 1 mechanism. Limit switches (not shown) in circuit with motor 8 confine carriage 3 to a path which is the length of the rolling periphery of wheel 6.

Any desired load, such as the planar table 4a of Fig. 1a, may be connected to reciprocating bed 1, and if connected directly thereto will have imparted to it substantially zero acceleration and deceleration.

While Fig. 3a discloses specifically an inversion of the Fig. 1 mechanism, it will be obvious that the two-wheel carriage modulator mechanism of Fig. 3 can be similarly inverted, by making rack 25 reciprocable on its base plate 26, connecting collector 27 directly to rack 25, and moving pivot 29 from collector 27 to a postion where it is fixed with respect to base plate 26.

As already indicated, the drive modulating mechanism of the present invention, and in particular that of Figure 3, can be employed to advantage in equipment for storing motor cars or other large objects which are carried on platforms (or sets of platforms). These may be arranged in two parallel ranks disposed one above the other or side by side, the cars or the like being circulated by transferring a platform or set of platforms from the end of one rank into a vacant space at the adjacent end of the other rank, advancing the platforms or sets of the first rank one space, so as to leave a vacant space at the opposite end of that rank, transferring into this space a platform or set from the adjacent end of the second rank and so on. In Figure 5 two possible arrangements are illustrated diagrammatically of thus circulating pairs of platforms 35a and b in two side by side ranks 36, 37 of such pairs, Figure 5a showing one in which there are two vacant spaces permitting simultaneous opposite movements in the ranks followed by simultaneous transfer at the opposite ends, i. e. two movements per cycle, whilst according to Figure 5b for use where economy of space is the primary consideration, there is only one vacant space, in which circumstances circulation requires four successive operations for each advance. It will be appreciated that the time of circulation can be halved by using the Figure 5a arrangement as compared with that of Figure 5b.

It is desirable to provide an individual driving mechanism for each rank 36 and 37, operated from a master control which also governs the end traversing mechanism. It is also desirable that this control should extend to suitable mechanism for coupling and uncoupling the driving mechanisms of the ranks to and from the platforms thereof and for blocking the platforms in a rank to prevent creeping thereof when they are required to be stationary. Thus in the Figure 5a lay-out, the platforms of the ranks need to be simultaneously coupled to their respective driving mechanisms and simultaneously uncoupled therefrom and blocked whilst the end traverses are taking place. On the other hand, in the lay-out of Figure 5b, the platforms of one rank require to be coupled to the driving mechanism thereof whilst those of the other rank are blocked. The present invention is not concerned either with the master control system or with the mechanism for end traversing.

In the parking or storage equipment next to be described and as shown in Figures 6 to 12, the pairs 35a and b of platforms in each main rank 36 and 37 are themselves arranged in subordinate ranks 36a and b and 37a and b in each of which the individual platforms are respectively coupled togther at the ends. These subordinate ranks are always moved synchronously in the respective main ranks, each of the latter being adapted to be moved by its own drive modulating mechanism, which may be arranged near the middle of the rank between its component subordinate ranks, to and from the platforms of which said mechanism is adapted to be coupled and uncoupled simultaneously, all the platforms of the rank being movable together with one platform in each subordinate rank is driven, by reason of the end couplings between the platforms.

In a pit 38 between the middle part of the runways of the platforms in subordinate ranks 37a and b is arranged (as shown in Figure 6) the drive modulating mechanism for operating the near side rank 37. The longitudinal guide rails 39, formed of inwardly facing channel members arranged to carry the platforms of subordinate rank 37a, are shown in full in Figure 6, but only the foundation girder 40 for the inner guide rail of subordinate rank 37b appears. The endless driving chain 41 for the drive modulating mechanism is itself driven from sprockets 42 one of which is rotatable by shaft 43 from a simple electric motor (not shown). The upper run of this chain is provided with a special link 44 by which it makes connection with shaft 32 of the carriage. The chain extends sufficiently far to permit of link 44 being reciprocated over a distance covering the required longitudinal travel of the carriage. At its far end the chain passes around an adjustably mounted sprocket 45.

In Figure 7, the carriage 18, which in all essentials resembles that shown in Figure 3, is shown in position with its central shaft 32 coupled with link 44 which in this drawing is of course hidden by the carriage. In addition to the engagement between pins 24 and the slots in the top edges of the rack angle irons 25 on mounting plate 46, stops 47 are provided at either end of the path of pin 31 so as to determine the limiting positions of the latter with precision, for the reasons which will hereinafter appear.

In Figure 8, the collector 27 is shown in position over the carriage 18 and with one of its upper pair of rollers 28 in engagement with one of the channel rails 49 which are substantially similar to those 39 for the platforms. The lower pair of rollers 28 on collector 27 engage other channel rails 49a similar to and located just below rails 49. Only the far side rail 49 appears in the drawing (Fig. 8), the near one and its supports being removed for clarity of illustration. Both sets of rails 49 extend just sufficiently far to cover the distance over which collector 27 has to reciprocate backwards and forwards, which distance is in fact the length of one of the platforms, so that when the collector is at one end of its path it can be appropriately coupled to a platform and then be shifted with the latter to the other end of its path, where it can, on being detached, be moved back free to its first position where the next platform will be ready to be similarly coupled to it. Although, as already described, the design of the 2-wheel carriage 18 inherently fixes the desired limits of the travel of the collector, this characteristic is supplemented by positive stops 47.

Mechanism for coupling and uncoupling the platforms to and from the collector and for blocking the platforms when required, appears in Figures 9, 9a and 9b and will next be described. The pit 38 containing the drive modulating mechanism and with the collector 27 reciprocating over it, is shown for the near side rank 37 only with the collector at its near limiting position. All the platforms 35a and b throughout the equipment are similar, each being preferably formed as shown with a grid-like tread face 50 having overhanging side edge border flanges 51 and pairs of rollers 52 at intervals along its length for running within the rails 39, the top flanges of which are overlaid by the flanges 51 of the platforms. Adjacent ends of the platforms are closely intercoupled at 53 by means which permits of the required lateral separation for traversing from rank to rank, but which it is not necessary to describe in detail in connection with the present invention, they being such as, for example, the platform coupling means which are disclosed in my copending application Serial No. 764,779, filed July 30, 1947. Figure 10 is a section of rank 37 showing the normal disposition of the platforms with respect to the rails. However, over a distance extending away from one end of pit 38 and from the corresponding limiting position of the collector, such distance being equal to about the length of one platform, the track is modified to the section shown in Figure 11. Over this section, there is accommodated between the adjacent subordinate ranks 37a and b, a pair of rods 54 one alongside each subordinate rank. At one end, each of these rods is secured to the collector 27, as by pivoting the end of the rod on the shaft which carries the adjacent wheel 28 (as shown in Figure 9b), so that the rods share in the reciprocation of the collector. At its other end, each rod carries a block 55 on which is pivoted a trigger link 56, capable of lateral outward swinging from the line of the rod and carrying at its outward extremity a downwardly directed pin or lug 57. Over the said modified length of track, the inner rails for the platform rollers in each rank (for which purpose the channel rails 39 serve elsewhere as already described) are formed as simple angle members 58 in place of the channels. Alongside these are similar but oppositely directed angle rails 59 on which the rods 54 are adapted to ride. Enclosure of the rods is completed by the inverted angle sections 60, the top flanges of which extend over beneath the adjacent border flanges 51 of the platforms. Under these top flanges and over the top edges of rails 58 and 59 extends a space deep enough to enable the trigger links 56 to be slid through it as hereinafter described. Enlarged parts 61 (see especially Fig. 9a) on the rods 54 form guides engaging the adjacent faces of rails 59 and sections 60 whereby the rods are held against lateral displacement. Holding-down bolts for rails 58 and 59 are provided as at 62 whilst the area between the border flanges 51 of the platforms occupied by the pit 38, the collector 27 and the parts associated with rods 54, is covered in by plating 63 which is substantially on a level with the platform treads so that the whole surface is uninterrupted.

The depending pins or lugs 57 on the trigger links are adapted to be moved into and out of engagement with jaws 64 projecting laterally from the adjacent side of each platform at a corresponding position, preferably near one end of each. Although only one-half of one of the jaws 64 is visible in Figures 9 and 9a, it will be understood that each such jaw consists of two similar triangular members, separated sufficiently to accept a lug 57 between them and thus to permit the platforms to be driven in either direction. When in engagement with these jaws, lugs 57 are in line with the platform rollers and are able to travel along the respective rails 58 in which circumstances, the links 56 being swung outwardly as shown in Figures 9 and 9a, they extend across the adjacent top edges of rails 58 and 59 along which they are able to slide beneath the top flanges of sections 60. On the other hand, when lugs 57 are moved towards one another out of engagement with jaws 64 so that the links 56 are substantially in line with rods 54, the lugs are able to travel along the rails 59.

Coupling and uncoupling to and from the platforms as just described, is possible only at two stations, viz. those which lugs 57 occupy when collector 27 is at either end of its traverse, i. e. a platform length apart. At these places, rails 58 and 59 terminate and the ordinary type rails 39 on the same sides of the platforms commence, there being, however, a gap 65 left at each such junction through which lugs 57 are able to pass into and out of engagement with jaws 64. For moving lugs 57 in the required manner, a cross-traversing coupling-operating mechanism is provided at each station. Extending across the space between the two subordinate ranks 37a and b is a guide 66 on which two blocks 67 are slidably mounted. Each of the blocks is provided with an upstanding boss 68 capable of being moved into one of the gaps 65 (the position shown in Figures 9, 9a and 12a) and, in moving up to do this, of pushing lug 57 before it through the gap into engagement with the jaw 64. Each block 67 is also formed with a second upstanding boss 69 spaced away from the first and adapted, when the block is moved in the opposite direction, to disengage the lug 57 from the jaw and bring it back through the gap into alignment with its associated rod 54 (the position shown in Figure 12b). The bosses 69 are then in a position also to block the rollers 52 of the platforms and so to prevent the latter from creeping. The bosses 68 and 69 are spaced apart sufficiently to permit of an intermediate position of the blocks in which lugs 57 are not coupled with the platforms by bosses 68, nor are the platform rollers blocked by bosses 69, this position not being assumed in normal working, but being of use in servicing and adjusting the mechanism when free through travel of the platforms may be desired.

The blocks 67 are movable together and apart in synchronism by means of links 70 and 71 arranged on either side thereof and coupled thereto respectively at 72 and 73 (Figure 9a). These links are moved in opposite directions through a double bell-crank 74 adapted to be turned by reciprocation of the operating rod 75 which is movable longitudinally of the platform ranks, as by means disclosed in my copending application Serial No. 764,779, filed July 30, 1947. Rod 75 is suitably supported at intervals along its length by brackets 76 where connecting pins 77 of its adjacent sections may be slidably anchored in slots in the brackets, and is extended to operate the blocks of the cross-traversing coupling-operating mechanisms at both the aforementioned stations in synchronism and in a similar manner, i. e. so that when the blocks at one such station have engaged lugs 57 with the platforms, the corresponding blocks at the other station will be ready to receive the lugs in that condition and then to disengage them from the platforms. Similar considerations apply when the lugs 57 are moved unloaded along rails 59.

In addition to operating the cross-traversing coupling-operating mechanisms of the near rank 37, it is a matter of convenience that the rod 75 and bell-cranks 74 should also be used to operate, through extension links 78 and 79, the identically similar mechanisms of the far rank 36 since all preferably work in synchronism. However, for operation according to the lay-out of Figure 5b, it is desirable for the platforms of rank 36 to be blocked whilst those of rank 37 are coupled to the collector of that rank. Accordingly, as shown in Figures 9a and 12a and b, the blocks 67 in each of the cross-traversing coupling-operating mechanisms are connected by the extension links 78 and 79 in such a way that the two outside blocks are connected to one of the links and the two inside blocks to the other link, so that the blocks of the respective pairs move simultaneously in an opposite sense in the two ranks. However, for operation according to the lay-out of Figure 5a, the connection is made such that the right-hand block in each of the ranks is connected to one of the links and the left-hand block in each rank to the other link, so that the blocks of the respective pairs move in the same sense in the two ranks.

It will be seen how, by operation in appropriately timed sequence of the constant speed motors of the drive modulating mechanisms of the respective ranks backwardly or forwardly and of another motor acting to reciprocate rod 75, the whole equipment can be actuated in accordance with any desired system of circulation by means of a suitable master control of the motors.

I claim:

1. Drive modulating mechanism for displacing a load from one position of rest to another such position, comprising a mobile member, a flexible band movable about the mobile member, a connection from the flexible band to the load and also a connection from the flexible band to a fixed anchor, said connections permitting travel of the mobile member relatively both to the load and to the anchor, and a coupling pin on the flexible band constituting one of such connections and being constrained by movement of the flexible band to follow a circuit on the mobile member an end of said circuit being substantially adjacent the other such connection, and said mechanism being so constructed and arranged that said coupling pin is caused to traverse said circuit with the flexible band, with corresponding travel of the mobile member under restraint of the other such connection, whereby the load becomes displaced with respect to the anchor at low terminal acceleration and deceleration.

2. Drive modulating mechanism according to claim 1, wherein the coupling pin is adapted to be connected to the load, said anchor includes a track, and said mobile member is adapted to be moved along said track.

3. Drive modulating mechanism according to claim 1, wherein the path of motion of the flexible band on the mobile member is semi-circular at its ends with a tangential reach therebetween.

4. Drive modulating mechanism according to claim 1, in which said anchor includes a straight track engaged by said mobile member.

5. Drive modulating mechanism according to claim 1, in which said anchor includes a rack with which said flexible band is adapted to make positive engagement.

6. Drive modulating mechanism according to claim 1, wherein the coupling pin is adapted to be connected to the load and the mobile member is adapted always to move in the direction in which the load is displaced.

7. Drive modulating mechanism according to claim 1, wherein the mobile member takes the form of a chassis with said flexible band passing around it to provide a carriage adapted to be moved along a relatively fixed track, the engagement of the carriage with the track constituting said other connection, and said coupling pin being adapted to be connected to the load.

8. Drive modulating mechanism for displacing a load from one position of rest to another such position comprising a mobile member, a flexible band movable about the mobile member, means included in said mobile member to hold the flexible band elongated in the direction of movement of said member, a connection from the flexible band to the load and also a connection from the flexible band to a fixed anchor, said connections permitting travel of the mobile member relatively both to the load and to the anchor, and a coupling pin on the flexible band constituting one of such connections and being constrained by movement of the flexible band to follow a circuit on the mobile member, an end of said circuit being substantially adjacent the other such connection, and said mechanism being so constructed and arranged that said coupling pin is caused to traverse said circuit with the flexible band, with corresponding travel of the mobile member under restraint of the other such connection, whereby the load becomes displaced with respect to the anchor at low terminal acceleration and deceleration.

9. Drive modulating mechanism according to claim 8, wherein the flexible band passes around two wheels lying in the same plane and having their axes spaced apart in the direction of movement of the mobile member.

10. Drive modulating mechanism according to claim 8, wherein the mobile member is adapted to overrun outside the limits of movement of the load without effect on the latter.

11. Drive modulating mechanism according to claim 1, including a pivotal linkage between said coupling pin and the load, whereby said pin transmits to the load the component of said pin's movement in the direction of travel of the load.

12. Drive modulating mechanism according to claim 1, in combination with a constant speed power source drivably connected to said mobile member.

13. Drive modulating mechanism according to claim 1, including a power source and a chain adapted to be driven by said power source in the direction of movement of said mobile member, said chain being drivably connected to said mobile member.

14. Drive mechanism for moving a load from one position of rest to another along a first predetermined path, comprising in combination, an anchor, a first mobile member which has a first connection with the load and a second connection with said anchor and is displaceable with respect to said anchor along a second predetermined path, driving means adapted to cause such displacement, and a second mobile member comprising a coupling pin carried upon said first mobile member and constituting one of said connections and displaceable, as said first mobile member is displaced along said second path, along a third predetermined path which is defined upon said first mobile member and in part at least lies transverse to said first path, said third path at an end thereof being substantially parallel with said second path, and one of said connections being constructed and arranged so as to permit motion of said coupling pin in a direction transverse to said first path without imparting said transverse motion to the load, said first mobile member including a flexible band supported thereon and constrained to circulate thereon as said first mobile member is displaced along said second path, said band defining said third path and said coupling pin being fixed upon said band.

15. Drive mechanism in accordance with claim 14, in which said anchor defines said second path, said first mobile member is movable along said second path in engagement with said anchor, and, said coupling pin constituting one of said connections, said engagement constitutes the other of said connections.

16. Drive mechanism for moving a load from one position to rest to another along a first predetermined path, comprising in combination, an anchor, a mobile member displaceable with respect to said anchor along a second predetermined path, driving means adapted to cause such displacement, a coupling pin carried upon said mobile member and displaceable, as said mobile member is displaced along said second path, along a third predetermined path which is defined upon said mobile member and in part at least lies transverse to said first path, said third path adjacent an end thereof being substantially parallel with said second path, and means drivably connecting said coupling pin to the load and including means adapted for motion of said coupling pin in a direction transverse to said first path without imparting said transverse motion to the load, whereby a projection of the motion of said pin is imparted to the load, said mobile member including a flexible band supported thereon and constrained to circulate thereon as said mobile member is displaced along said second path, said band defining said third path and said coupling pin being fixed upon said band.

17. Drive mechanism in accordance with claim 16, in which a radius vector from an origin on said mobile member to the center of said coupling pin rotates about said origin as said mobile member and said coupling pin move along their respective said paths, the displacement of said mobile member along a portion of said second path is a function of the angle of rotation of said vector, and the acceleration in space, in the direction of said movement of the load, which is imparted to said coupling pin while said mobile member moves along said portion of said second path, is a sine function of the angle of rotation of said vector.

18. Drive mechanism in accordance with claim 16, in which said second and third paths are so proportioned and arranged with respect to one another that, at said end of said third path, the motion of said mobile member in a direction parallel with said first path is equal and opposite to the motion of said coupling pin with respect to said mobile member in a direction parallel with said first path.

19. Drive mechanism in accordance with claim 16, in which said second and third paths are so proportioned and arranged with respect to one another that the respective linear velocities of said mobile member and of said coupling pin along their said paths are substantially equal.

20. Drive mechanism in accordance with claim 16, in which, as said mobile member and said coupling pin move in their respective said paths, said pin traces in space a curve of which the terminal part is substantially cycloidal.

21. Drive mechanism in accordance with claim 16, in which said mobile member is movable along said second path in engagement with said anchor, and said third path follows substantially the periphery of said mobile member.

22. Drive mechanism in accordance with claim 16, in which said mobile member comprises a circular member rollable along said second path, and said coupling pin lies substantially at the rolling circle of said circular member during at least part of its displacement along said third path.

23. Drive mechanism in accordance with claim 16, in which said anchor includes a rack defining said second path, said mobile member includes a toothed wheel which meshes with said rack and is rollable along it, and said coupling pin lies substantially at the wheel's rolling circle during at least part of its displacement along said third path.

24. Drive mechanism in accordance with claim 16, in which said mobile member comprises a chassis elongated in the direction of said first path and displaceable along said second path by rolling means, said third path follows substantially the envelope of said rolling means, said flexible band is supported upon said chassis and is constrained to circulate upon it as the latter travels along said second path, and successive portions of said band engage said anchor as said chassis travels along said second path, whereby said chassis may overrun by a predetermined distance a position corresponding with one of said positions of the load without causing further displacement of the load.

25. Drive mechanism in accordance with claim 16, in which said mobile member comprises a chassis displaceable along said second path by rolling means, said third path follows substantially the envelope of said rolling means, a pair of substantially coplanar supports are mounted upon said chassis and are spaced apart in the direction of said first path, said endless flexible band is mounted upon and encircles said supports, said band being constrained to circulate about said supports as said chassis travels along said second path, and successive portions of said band engage said anchor as said chassis travels along said second path, whereby said chassis may overrun by a predetermined distance a position corresponding to one of said positions of the load without causing further displacement of the load.

26. Drive mechanism in accordance with claim 16, in which said anchor comprises a rack defining said second path, said mobile member comprises a chassis displaceable along said second path by rolling means, said third path follows substantially the envelope of said rolling means, a pair of substantially coplanar sprockets are mounted upon said chassis and are spaced apart in the direction of said second path, said flexible band is articulated and endless and is mounted upon and encircles and meshes with said sprockets, said band being constrained to circulate about said sprockets when said chassis travels along said rack, and a portion of said band meshes with said rack, whereby said chassis may overrun by a predetermined distance a position corresponding to one of said positions of the load without causing further displacement of the load.

27. Drive mechanism in accordance with claim 16, in which said means drivably connecting said coupling pin to the load includes a collector drivably connected to the load.

28. Drive mechanism for moving a load from one position of rest to another along a first predetermined path, comprising in combination: an anchor; a mobile member displaceable with respect to said anchor along a second predetermined path; driving means adapted to cause such displacement; a coupling pin carried upon said mobile member and displaceable, as said mobile member is displaced along said second path, along a third predetermined path which is defined upon said mobile member and in part at least lies transverse to said first path, said third path adjacent an end thereof being substantially parallel with said second path; means drivably connecting said coupling pin to the load, said last means including second means adapted for motion of said coupling pin in a direction transverse to said first path without imparting said transverse motion to the load, whereby a projection of the motion of said coupling pin is imparted to the load, said second means further comprising a collector connected to said coupling pin, and third means selectively engaging said collector with and disengaging the same from the load, and including a way paralleling said second path with said collector being constrained to move along said way.

29. Drive mechanism in accordance with claim 28, in which said means drivably connecting said coupling pin to the load includes a load coupler connected to and movable with said collector and movable selectively into and out of driving engagement with the load, and an operating member for said load coupler, said operating member being located at a station corresponding with one of said positions of rest of the load and being engageable with said load coupler when the load is at its said one position.

30. Drive mechanism in accordance with claim 28, in which said means drivably connecting said coupling pin to the load includes a load coupler connected to and movable with said collector and movable selectively into and out of driving engagement with the load, and a pair of operating members for said load coupler, said operating members being located at spaced stations corresponding with said positions of rest of the load, one of said operating members being engageable with said coupler when the load is at the corresponding one of its said positions, and both of said operating members being interconnected for simultaneous movement in the same direction, whereby, when the said operating member at the station corresponding to the then position of rest of the load moves said load coupler into or out of engagement with the load, said other operating member is simultaneously positioned to engage said coupler when the load is moved to its other said position of rest.

31. Drive mechanism for moving a load from one position to another along a first predetermined path, comprising in combination, a relatively fixed anchor, a mobile member displaceable with respect to said anchor along a second predetermined path, driving means adapted to cause such displacement, a third predetermined path which is defined upon said mobile member and which in part at least lies transverse to said first path, a flexible band supported upon and constrained to circulate upon said mobile member as the latter is displaced along said second path, said band defining said third path, a coupling pin fixed on said band, and means drivably connecting said coupling pin to the load and being so constructed and arranged as to permit motion of said pin in a direction transverse to said first path without imparting said transverse motion to the load, whereby a projection of the motion of said pin is imparted to the load.

32. Drive mechanism for moving a load from one position to another along a first predetermined path, comprising in combination, a relatively fixed anchor, a mobile member displaceable with respect to said anchor along a second predetermined path, driving means adapted to cause such displacement, a third predetermined path which is defined upon said mobile member and in part at least lies transverse to said first path, a flexible band supported upon and constrained to circulate upon said mobile member as the latter is displaced along said second path, said band defining said third path, and said second path at an end thereof being substantially parallel with said third path, a coupling pin fixed on said band, and means drivably connecting said coupling pin to the load and being so constructed and arranged as to permit motion of said pin in a direction transverse to said first path without imparting said transverse motion to the load, whereby a projection of the motion of said pin is imparted to the load.

33. Drive mechanism for moving a load from one position of rest to another, comprising in combination a reciprocable mobile member, a collector drivably connected to the load by means movable selectively into and out of driving engagement with the load, and means drivably connecting said mobile member to said collector, said first means including a load coupler connected to and movable with said collector and also movable selectively into and out of driving engagement with the load, and an operating member for said load coupler, said operating member being located at a station corresponding with one of said positions of rest of said collector and being engageable with said load coupler when said collector is at its said one position.

34. Drive mechanism for moving a load from one position of rest to another, comprising in combination, a mobile member translationally movable along a first predetermined path, a relatively fixed anchor defining a second predetermined path in space, a coupling pin mounted on said mobile member and constrained to follow said second path, means adapted to drive said coupling pin along a third predetermined path defined upon said mobile member while said coupling is so constrained, whereby said mobile member is translationally displaced along said first path, and means drivably connecting the load to said mobile member and including a load-connected member making rolling engagement with said mobile member.

35. Drive mechanism in accordance with claim 34, in which said mobile member is itself rotatable, and said coupling pin is mounted at substantially the rolling periphery of said mobile member.

36. Drive modulating mechanism for displacing a load from one position of rest to another such position, comprising a mobile member, a connection from the mobile member to the load and also a connection from the mobile member to a fixed anchor, said connections being mounted for the travel of the mobile member relatively both to the load and to the anchor, a coupling pin constituting one of such connections and being constrained to follow a path on the mobile member and an end of said path being substantially adjacent the other such connection, a source of mechanical power, and rotating driving means between said power source and said mobile member, said power source and driving means being mounted on and travelling with said mobile member, said mechanism being adapted to cause said coupling pin to traverse said path as the mobile member travels under restraint of the other such connection, and at said end of said path the components, parallel with the direction of load displacement, of the velocity of said coupling pin with respect to said mobile member and of the velocity of said mobile member itself being substantially equal and oppositely directed, whereby the load becomes displaced with respect to the anchor at low terminal acceleration and deceleration.

37. Drive modulating mechanism for displacing a load from one position of rest to another such position, comprising a rolling mobile member, a connection from the mobile member to the load and also a connection from the mobile member to a fixed anchor, said connections being mounted for the travel of the mobile member relatively both to the load and to the anchor, a coupling pin located substantially at the rolling periphery of the mobile member and constituting one of such connections, a source of mechanical power, and rotating driving means between said power source and said mobile member, said power source and driving means being mounted on and travelling with said mobile member, said mobile member being in rolling engagement with said anchor and such rolling engagement constituting said other connection, at one of said positions of rest said coupling pin being substantially adjacent said other connection, and at said position the components, parallel with the direction of load displacement, of the velocity of said coupling pin with respect to said mobile member and of the velocity of said mobile member itself being substantially equal and oppositely directed, whereby the load becomes displaced with respect to the anchor at low terminal acceleration and deceleration.

References Cited in the file of this patent

UNITED STATES PATENTS

| Number | Name | Date |
|---|---|---|
| 455,248 | Fennell | June 30, 1891 |
| 513,555 | Brady | Jan. 30, 1894 |
| 520,828 | Miehle | June 5, 1894 |
| 595,732 | Pitt | Dec. 21, 1897 |
| 1,635,813 | Borski | July 12, 1927 |
| 1,926,174 | Reilly | Sept. 12, 1933 |
| 2,165,641 | Matox | July 11, 1939 |
| 2,216,637 | Auger | Oct. 1, 1940 |
| 2,258,530 | Auger | Oct. 7, 1941 |
| 2,304,116 | Fitch et al. | Dec. 8, 1942 |